Q. R. & P. MOORE & E. L. PATRICK.
Corn Planter.
No. 84,568. Patented Dec. 1, 1868.
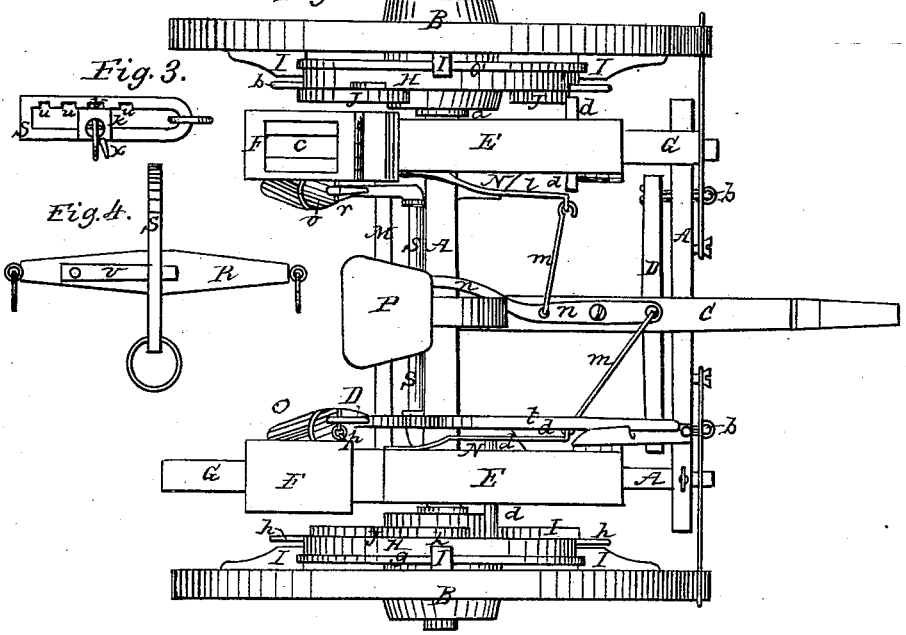

Q. R. MOOR, PETER MOOR, AND E. L. PATRICK, OF FOREST HILL, INDIANA.

Letters Patent No. 84,568, dated December 1, 1868.

IMPROVEMENT IN CORN-PLANTERS.

The Schedule referred to in these Letters Patent and making part of the same.

*To all whom it may concern:*

Be it known that we, Q. R. MOOR, PETER MOOR, and E. L. PATRICK, of Forest Hill, in the county of Decatur, and in the State of Indiana, have invented certain new and useful Improvements in Corn-Planters; and do hereby declare that the following is a full, clear, and exact description thereof, reference being had to the accompanying drawings, and to the letters of reference marked thereon.

The nature of our invention consists in the construction and general arrangement of a corn-planter, by which two rows of corn can be planted at the same time, and which is easily adjusted to suit any kind of ground or depth of plowing desired.

In order to enable others skilled in the art to make and use our invention, we will now proceed to describe its construction and operation, referring to the annexed drawings, which form a part of this specification, and in which—

Figure 1 is a plan view,

Figure 2, a side section, and

Figures 3 and 4, front and side views of the neck-yoke used in combination with our planter.

A represents a frame of suitable dimensions, to and under the rear end of which the axle $a$ is secured, the wheels B B being placed outside of the frame, on the ends of said axle.

The tongue C is placed in the centre of the frame, and on its lower side, in rear of the front part of the frame, the double-tree D is pivoted. From the ends of said double-tree rods $b\ b$ extend through the front part of the frame, and to these rods the single-trees are attached in some suitable manner.

On the sides of the frame two oblong boxes, E E, are placed, in the rear end of which the grain-boxes F F are formed. The grain-boxes have an oblong slot, $c$, in their bottom, through which the corn falls down on the slides G G, and as much thereof as may be desired into a hole on the same.

The slides G G are placed and run in the oblong boxes E E, under the slotted bottom of the grain-boxes, and have, at a suitable point on each side, a pin, $d$, projecting through a slot on each side of said boxes E E.

The amount of corn to be planted in each hill is regulated by means of a gauge in the front end of the hole or slot already mentioned, on said slides.

In the front part of the bottom of the grain-boxes a brush, $e$, is placed, which extends down on to the slide G, and when the slides are moved forward by the means hereinafter to be described, this brush serves to prevent any more corn than what is in the hole on the slide to be carried out. When the slide is moved forward, the corn falls through a hole, $f$, in the bottom of the box E, and passing through the tube F′, which is placed around said hole, under the box, and in rear of the axle $a$, is deposited in the ground.

On the inner side of the wheels B B are smaller false wheels, H H, which are held around the hub thereof by means of slotted blocks I I, attached to its spokes. These false wheels H H are nothing more than an annular disk, with a flange, $g$, projecting from the outer edge of its outside periphery, which flange extends into the slots on the blocks I I, so that the wheels H may be revolved, if desired, independent of the driving-wheels, by means of handles, $h\ h$, placed at suitable distances apart on the inner edge of its outer periphery.

The inner periphery of the wheel H is provided with a series of notches; and a spring-pawl, $i$, extending from one of the spokes of the wheel B into said notches, allows the wheel H to revolve at the same time, and with the driving-wheels.

On the inner side of the wheels H H is a series of blocks, J J, which are rounded on the outside, and as the wheel revolves, the projecting pin $d$, on the slide G, moves the same forward far enough to discharge the corn through the tube F′. As soon as the pin $d$ clears the block J, a spring, $k$, on the lower side of the slide G, inside of the box E, drives the slide back to receive more corn from the grain-boxes.

The number of blocks to be placed on the side of the wheel H depends upon the number of hills it is desired to plant at each revolution of the wheel.

On the inner side of the boxes E E are springs, $l\ l$, which are so arranged that when the slides G G have been moved as far forward as possible, by means of the blocks J J, said springs catch on the inner pin $d$, projecting from said slides, preventing them thereby to return.

These springs are connected, by means of rods $m\ m$, to a lever, $n$, on the tongue C, so that they can be removed, thus allowing the slides to operate.

A suitable arrangement is made on the frame A to hold the lever $n$ in position.

From the rear part of the sides of the frame A, bars K K extend forward, which bars are some distance below the front part of said frame, and connected therewith by means of bolts $o\ o$.

To the front end of these bars K K the front end of a frame, consisting of side-bars L L and a cross-bar, M, is attached, in such a manner that it can be raised or lowered at will; and this frame is further suspended in rear of the axle, by means of chains, $p$, running up from the side bars L to hooks $r\ r$, on a cross-arm, $s$, which are set in loops on the rear part of the frame A. A lever, $t$, is attached to said cross-arm, so that the frame mentioned can be raised or lowered by turning said lever.

To the side-bars L L, as well as to the cross-bar M, in front of the tubes F′ F′, the plows N N are secured, and in rear of said tubes the covering-plows O O are placed. These are, however, attached to bars running down from the side-bars L L.

A seat, P, is arranged over the rear part of the frame A, so that the driver has the levers *n* and *t* within his reach.

The plows can be set deep or shallow, as may be desired, by raising or lowering the front ends of the bars L L, and by raising or lowering the chains *p p* by means of the hooks *r r*. By the use of the lever *t* and cross-arm *s*, the plows can be lifted entirely out of the ground, to avoid roots, stones, &c., in turning, or in passing from one field to another.

The plows can also be regulated by raising or lowering the tongue C, which is effected by moving the neck-yoke R up or down in the clevis S. One of the inner sides of the clevis is provided with a series of notches, *u u*, in which notches a spring, *v*, on the side of the yoke, fits, said spring being pressed outward into said notches by a screw, *x*, passing from the other side of the yoke, through the same, as shown in figs. 3 and 4.

Having thus fully described our invention,

What we claim as new, and desire to secure by Letters Patent, is—

1. The arrangement of the boxes E E, grain-boxes F F, and the slides G G, all constructed as described, and operating substantially as and for the purposes herein set forth.

2. The wheels H H, constructed as described, and held on the driving-wheels B B by means of the slotted blocks I I, and provided with a series of rounded blocks, J J, on their inner sides, for the purpose of operating the slides G G, substantially as herein set forth.

3. The arrangement of the lever *n*, rods *m m*, and springs *l l*, for the purpose of throwing the slides G G in and out of gear, to be operated or not by the wheels H H, as may be desired, substantially as herein set forth.

In testimony that we claim the foregoing, we have hereunto set our hands, this 19th day of June, 1868.

Q. R. MOOR.
      P. MOOR.
      E. L. PATRICK.

Witnesses:
 C. W. SISCO,
 HENRY MILLER.